United States Patent [19]

Winkler et al.

[11] Patent Number: 4,789,558

[45] Date of Patent: Dec. 6, 1988

[54] METHOD FOR PRODUCING SWEET PICKLES

[75] Inventors: Gary A. Winkler, Cottage Grove; Gerald O. Hustad, McFarland, both of Wis.

[73] Assignee: Oscar Mayer Foods Corporation, Madison, Wis.

[21] Appl. No.: 834,089

[22] Filed: Feb. 27, 1986

[51] Int. Cl.⁴ .................. A23L 1/218; A23L 1/212
[52] U.S. Cl. .................................. 426/639; 426/397
[58] Field of Search ............. 426/615, 639, 397, 281, 426/270, 321, 486

[56] References Cited

U.S. PATENT DOCUMENTS

| | | | |
|---|---|---|---|
| 2,801,925 | 8/1957 | Fisher | 426/639 |
| 2,865,758 | 12/1958 | Weckel | 426/639 |
| 3,578,466 | 5/1971 | Luckmann | 426/615 |
| 3,843,810 | 10/1974 | Fehmerliny | 426/615 |
| 4,006,257 | 2/1977 | Kolk | 426/321 |
| 4,018,908 | 4/1977 | Gross | 426/281 |
| 4,350,711 | 9/1982 | Kahn | 426/639 |
| 4,352,827 | 10/1982 | Fleming et al. | 426/615 |
| 4,353,930 | 10/1982 | Hirakara | 426/615 |
| 4,402,988 | 9/1983 | Macfie | 426/615 |
| 4,547,389 | 10/1985 | Palnitkau | 426/639 |

*Primary Examiner*—Donald E. Czaja
*Assistant Examiner*—Carolyn Paden
*Attorney, Agent, or Firm*—Joseph T. Harcarik; Thomas R. Savoie; Daniel J. Donovan

[57] ABSTRACT

A method of producing a sweet pickle. The pickle stock with its outer membrane perforated is treated to at least two vacuum and elevated treatment cycles in the presence of a $CaCl_2$ brine. The treated pickle stock is then allowed to equilibrate in the presence of a high sugar, sugar syrup before packaging.

20 Claims, No Drawings

METHOD FOR PRODUCING SWEET PICKLES

BACKGROUND OF THE INVENTION

1. Field of Invention

The present invention is directed to the production of pickled vegetable or fruit products. More particularly, the present invention is directed to a method of producing sweet pickled vegetable or fruit products.

2. Description of the Prior Art

The traditional method making sweet pickles is a process known as a tank sweetening. In the tank sweetening method, pickle stock is sweetened by immersion in a series of progressively more concentrated sugar solutions until the concentration of the sugar solids in the pickle is raised to about 40° Brix. In a typical process, pickle stock is first placed in a tank containing a syrup that is 30% sugar by weight. After one day, diffusion has caused the sugar concentration to equalize in the liquid phase and the pickle at about 15% by weight. The liquid phase is then either replaced with a higher concentration syrup or withdrawn, mixed with additional solid sugar to raise the concentration, and then returned to the tank. By a series of step-by-step increases in sugar concentration, the desired 40° Brix sweet pickles can be produced in a period of about 3 to 15 days.

Tank sweetening on a commercial scale has several disadvantages. First, the multi-step increases in sugar concentration requires that a manufacturer employ multiple tanks. Furthermore, the process produces large quantities of excess syrup. Finally, tank sweetening is undesirable because of the numerous sanitary and safety hazards associated with handling the syrup (e.g., contamination and spillage).

It would be extremely desirabe if sweet pickles could be produced by a syrup immersion process that eliminated as many of the syrup increase steps as possible. One of the major problems with trying to produce sweet pickles using a higher concentration sugar syrup is the problem of shrinkage of the pickle stock. The water content of cucumbers, for example, is above 90% by weight. Water migrates from the pickle stock into the surrounding liquid phase much more rapidly than the sugar can migrate across the membrane of the pickle stock. The net effect is that the pickle stock shrinks substantially and irreversibly.

Over the years, several processes as have been developed to try and eliminate this problem. One such process is described in U.S. Pat. No. 2,865,758. In this patent the stock is first punctured and then submerged in the sugar syrup. While the stock is submerged the entire process is subjected to a vacuum pressure and is held for about 15 to 20 minutes. As the vacuum is released, the stock then absorbes the sugar solution.

In U.S. Pat. No. 2,801,925 the stock is subjected to a vacuum at an elevated temperature. Once the vacuum is reached the fruit is flooded within the chamber with the desired sugar solution. After about 15 minutes, the vacuum is broken and the fruit is allowed to stand in the flooding solution at atmospheric pressure and at temperatures which naturally decrease to room temperature for approximately a 24 to 72 hour period.

U.S. Pat. No. 4,402,988 also describes a very similar situation. The process in U.S. Pat. No. 4,402,988 differs somewhat in that it uses a much higher vacuum and allows the dwell time of the stock to be immersed in the sugar solution for only about 10 seconds. Thereafter, they are removed and the product is frozen for further processing.

None of the above mentioned U.S. patents describe or disclose the process for producing a sweet pickle that Applicants have developed.

SUMMARY OF THE INVENTION

It is an object of the present invention to provide a method of making sweet pickles.

Another object of the present invention is to provide a method of making sweet pickles with a sweetener content of approximately 40° Brix or higher.

It is also an object of the present invention to produce sweet pickles by immersing them in only a single sugar syrup prior to packaging.

Another object is to produce sweet pickles wherein the spent sugar syrup is reused in packaging.

Still another object of the present invention is to provide a method of producing sweet pickles by subjecting raw pickle stock to vacuum and elevated pressure treatment prior to immersion in a sugar syrup.

Yet another object of the present invention is to provide a method of producing sweet pickles by immersing pickle stock in a single, highly concentrated sugar syrup without significant shrinkage or damage to the pickle stock.

These objects of the present invention, as well as other objects apparent to those of skill in the art, are achieved by the following embodiments of the present invention.

Accordingly, the present invention provides a method of producing sweet pickles that involve vacuum and pressure steps prior to immersion in the sugar syrup.

DETAILED DESCRIPTION OF THE INVENTION

The present invention provides a method for producing sweet pickles with a sweetener content greater than 35° Brix and preferably about 40° to about 50° Brix or more. Surprisingly, applicant has discovered that sweet pickles can be prepared by a method comprising essentially covering sliced, perforated pickle stock in a calcium chloride brine ($CaCl_2$) then subjecting the immersed pickle stock to vacuum and pressure cycles. After the vacuum and pressure treatments, the pickle stock is then submerged in a sugar syrup.

The present invention is significantly advantageous over prior art methods in that it requires only a single immersion of pickle stock in a sugar syrup prior to packaging, avoids damage to the pickle stock normally expected from high concentration sugar syrup and avoids the production of excess syrup and obviates the sanitation and safety problems presented by handling waste syrups. Applicants' discovery is particularly unexpected since it was believed in the art that the high-concentration sugar syrups employed in the present invention would irreversibly shrink and damage the pickle stock, even sliced, perforated pickle stock, and especially when the pickle stock is not subjected to the vacuum treatment in the presence of the sugar syrup.

Applicants have discovered that a highly concentrated sugar syrup does not cause significant shrinkage of sliced, perforated pickle stock if the pickle stock has been allowed to absorb significant amounts of calcium chloride prior to immersion in the sugar syrup and with adequate sugar syrup circulation.

The pickle stock to be employed may be sliced and can be fresh or fermented vegetable or fruit stock. Even so the inventors have found that it is critical to perforate the membrane of the pickle stock to prevent damage to the pickle stock due to the osmotic pressure. It is to be understood that by perforation is meant the making of small diameter holes in the outer membrane. Preferably, the holes are not generally detectable by casual inspection with the naked eye. These perforations can be made by any method known to those of skill in the art. A relatively simple (and thus preferred) method of perforating the outer membrane is pricking the outer membrane with a needle. Commercially available pricking panels are particularly suited for large scale pricking of pickle stock. The length of the panels employed and the gauge of the needle on the panels can be readily determined to those of skill in the art.

The degree of perforation required can vary depending upon the pickle stock employed and the exact concentration of the sugar in the syrup. It is only necessary that the membrane be sufficiently perforated so that the osmotic pressure generated by the high concentration of sugar in the syrup does not cause significant shrinkage. Significant shrinkage will irreversibly damage the pickle stock and make it undesirable to consumers. Significant shrinkage is typically about a 10% or more irreversible reduction in volume after about one month of storage. Preferably, the irreversible shrinkage is no more than about 5% by volume.

The perforated pickle stock can then be sliced or left whole, if sufficiently small. The sliced pickle stock is then covered with a calcium chloride vacuum/pressure brine. The calcium chloride vaccum/ pressure brine should contain from about 1.0% to about 2.0% calcium chloride. The calcium chloride vacuum/pressure brine and the pickle stock are added to a sealable vessel. Once the vessel is filled and the pickle stock is covered by the vaccum/pressure brine the vessel is sealed and a vacuum is drawn. The vacuum obtained should be at least about 18 inches Hg. After the desired vacuum is obtained the vacuum is held for about 3 to about 10 minutes. The vacuum is then released and pressure is applied until the pressure registers from about 45 to about 75 psig. Here as with the vacuum, after obtaining the desired pressure it is held for about 3 to about 10 minutes before being released. The vacuum and pressure cycles are repeated at least one additional time. At this point the pickle stock is removed or the calcium chloride vaccum/pressure brine is removed and a second calcium chloride treatment brine is added. As before, the pickle stock is covered by the calcium chloride treatment brine containing from about 1.0% to about 20% calcium chloride. The brine temperature is maintained at about 35° to about 45° F. and preferably, should be circulated throughout this treatment cycle. The calcium chloride pickup in the pickle stock should be or should obtain about 0.2% to about 0.6% calcium by weight before proceeding.

The pickle stock is then seperated from the treatment brine and the treatment brine is replaced with a high sugar syrup. By high sugar syrup is meant a fructose or sucrose sugar syrup wherein the Brix reading is from about 50° to about 90°. Due the nature of the syrup, an initial temperature is maintained at approximately 90°-95° F. In order to insure the complete submersion of the pickle stock in the syrup a hold down device is usually employed. The syrup can be recirculated during this time. During this time, and within five to eight hours, the temperature of the syrup must drop to 55° to about 35° F. and should be maintained at that temperature until sugar equalibration. When the sweetening process is complete, equilibrated Brix readings of the desired level should be obtained.

After sweetening, the pickle stock is removed from the processing tanks and placed in appropriate packaging material such as glass jars. A cover brine is usually added at the time of packaging and the desired formulation of this packaging brine is readily determinable by those skilled in the art.

The following example is presented for illustrative purposes and is not intended to limit the scope of the present invention.

EXAMPLE

The raw material (pickle stock) shall be cucumbers providing the diameter is of about ¾ to about 1½ inches. The pickle stock must be washed to insure removal of sand grit and mud and to meet grading standards. The cucumbers are then pricked on a commercial pickle pricker. The pricker bed can be set to any desired incline angle. Next the cucumber stock is fed into a commercial slicer. The pickle stock is sliced to about 0.4 to about 1.0 inch thick with a smooth (flat) surface. The pickle stock chunks are conveyed and accumulated in a 60 bussel tank containing sufficient calcium chloride vacuum/pressure brine (1.40-1.2% CaCl$_2$) The CaCl$_2$ is circulated to maintain its temperature at 35°-50° F.

| CaCl$_2$ Processing Brine | Percent (%) |
| --- | --- |
| Water | 95.63 |
| 33% CaCl$_2$ Solution | 4.37 |
| | 100.00 |

Some calcium chloride vacuum/pressure brine is added to the vacuum/pressure vessel first in order to cushion the pickle stock chunks while loading. The vacuum/pressure vessel is filled with cucumbers and the remaining volume of the vessel is filled with brine to cover the top of the pickle stock. The pickle stock must be below the surface of the brine when applying vacuum and pressure. Seal the vacuum/pressure vessel and apply vacuum to obtain minimum of 21 inches Hg. After obtaining the desired vacuum hold for five minutes, release the vacuum and apply 50 to about 70 psig pressure. After obtaining the desired pressure hold for five minutes and then release the pressure. The vacuum and pressure steps are repeated one additional cycle.

The pickle stock chunks are transferred to a processing tank which has been precharged with a calcium chloride treatment brine (1.4-1.7% calcium chloride). When the processing tank has been filed with 15,500 to 16,500 pounds of cucumbers a holdown device is installed and, the brine is circulated and chilled for 16 to 24 hours. The brine temperature should be maintained at 35°-50° F. during this circulation cycle. Analysis for calcium chloride is taken prior to and after circulation. The calcium chloride pickup in the cucumbers should be approximately 0.30 to 0.50% by weight before preceeding. After draining, pump high fructose corn syrup (69° to 71° Brix) from the corn syrup tank to the processing tank to obtain the following percentages:

| Ingredients | Weight Percent |
| --- | --- |
| High Fructose Corn Syrup | 65 |

| Ingredients | Weight Percent |
|---|---|
| Pickle Stock Chunks | 35 |
| | 100 |

The corn syrup is recirculated until equilibration is reached (3–7 days). During the recirculation period the corn syrup temperature which was initially pumped in at from about 90°–95° F. must drop to 35°–50° F. within 5 to 8 hours and should be maintained at that temperature until sugar equalibration. When the sweetening process is complete equalibrated Brix reading of 46° to 51° should be obtained.

The sweetened chunks are removed from the processing tank to the packing line. The sweetened chunks are packed and brined. Th cover brine is formulated to give the desired sweetness, acid and seasoning of the finished product.

We claim:

1. A method for reducing shrinkage in sweet pickle stock comprising:
   (a) covering pickle stock with a $CaCl_2$ vacuum/pressure brine in a sealable vessel, said pickle stock being perforated through the outer membrane of said pickle stock, and said vacuum/pressure brine containing from about 1.0% to about 2.0% calcium chloride;
   (b) sealing said vessel and applying from about 18 inches to about 29 inches Hg of vacuum and holding said vacuum for about 2 to about 10 minutes;
   (c) releasing said vacuum and applying from about 45 to about 75 psig pressure and holding said pressure for about 2 to about 10 minutes;
   (d) repeating said vacuum and pressure steps at least one additional time;
   (e) separating said pickle stock from said vacuum/pressure brine;
   (f) covering said pickle stock with a second $CaCl_2$ treatment brine said treatment brine containing from about 1.0% to about 2.0% calcium chloride;
   (g) holding said pickle stock in said treatment brine until a predetermined $CaCl_2$ pickup percentage is achieved;
   (h) separating said pickle stock from said treatment brine;
   (i) submerging said pickel stock in a high sugar, sugar syrup, said syrup being from about 50° to about 90° Brix; and
   (j) holding said submerged pickle stock in said sugar syrup until Brix readings equilibrate to a predetemined level.

2. A method for producing sweet pickles as claimed in claim 1 wherein said pickle stock is sliced.

3. A method for producing sweet pickles as claimed in claim 2 wherein said vacuum/pressure brine contains from about 1.4% to about 1.7% calcium chloride.

4. A method for producing sliced, sweet pickles as claimed in claim 3 wherein said vacuum is at least about 21 inches Hg.

5. A method for producing sliced, sweet pickles as claimed in claim 4 wherein said applied pressure is from about 50 to about 70 psig.

6. A method for producing sliced, sweet pickles as claimed in claim 5 wherein said vacuum and said pressure holding time is about 5 minutes.

7. A method for producing sweet pickles as claimed in claim 1 wherein each vacuum producing and vacuum holding cycle is from about 7 minutes to about 20 minutes.

8. A method for producing sliced, sweet pickles as claimed in claim 6 wherein said second $CaCl_2$ treatment brine contains from about 1.4% to about 1.7% $CaCl_2$.

9. A method for producing sliced, sweet pickles as claimed in claim 8 wherein said second $CaCl_2$ treatment brine is circulated and maintained at about 40° to about 45° F.

10. A method for producing sliced, sweet pickles as claimed in claim 9 wherein said pickle stock is held in said second $CaCl_2$ treatment brine from about 16 to about 24 hours.

11. A method for producing sliced, sweet pickles as claimed in claim 9 wherein said $CaCl_2$ pickup is from about 0.30% to about 0.50% by wight before processing.

12. A method for producing sliced, sweet pickles as claimed in claim 11 wherein said sugar syrup is circulated for about 3 to about 7 days.

13. A method for producing sliced, sweet pickles as claimed in claim 12 wherein the temperature of said circulating sugar syrup is from about 90° t about 95° F. at the time of initial contact with said pickle stock.

14. A method for producing sliced, sweet pickles as claimed in claim 13 wherein said circulating corn syrup temperature is reduced to about 35° to about 50° F. within from about 5 hours to about 8 hours of initial contact with said pickle stock.

15. A method for producing sliced, sweet pickles as claimed in claim 14 wherein said corn syrup temperature is maintained at about 35° to about 50° F. until sugar equilibration.

16. A method for producing sliced, sweet pickles as claimed in claim 15 wherein said equilibrated Brix readings are from about 46° to about 51°.

17. A method for producing sliced, sweet pickles as claimed in claim 16 wherein said equilibrated Brix readings are obtained after holding said submerged pickle stock in said circulating sugar syrup for about 3 to about 7 days.

18. A method for producing sliced, sweet pickles as claimed in claim 17 wherein said pickle stock is packaged with a cover brine that comprises: corn syrup; seasonings; salt; and vinegar.

19. A method for producing sliced, sweet pickles as claimed in claim 18 wherein said corn syrup comprises spent processing sugar syrup.

20. A method for producing sweet pickles as claimed in claim 1 wherein said high sugar, sugar syrup comprises a high fructose corn syrup.

* * * * *